Aug. 15, 1950  D. MAPES  2,518,483
METHOD OF MAKING RECEPTACLES
Filed Feb. 15, 1947  2 Sheets-Sheet 1
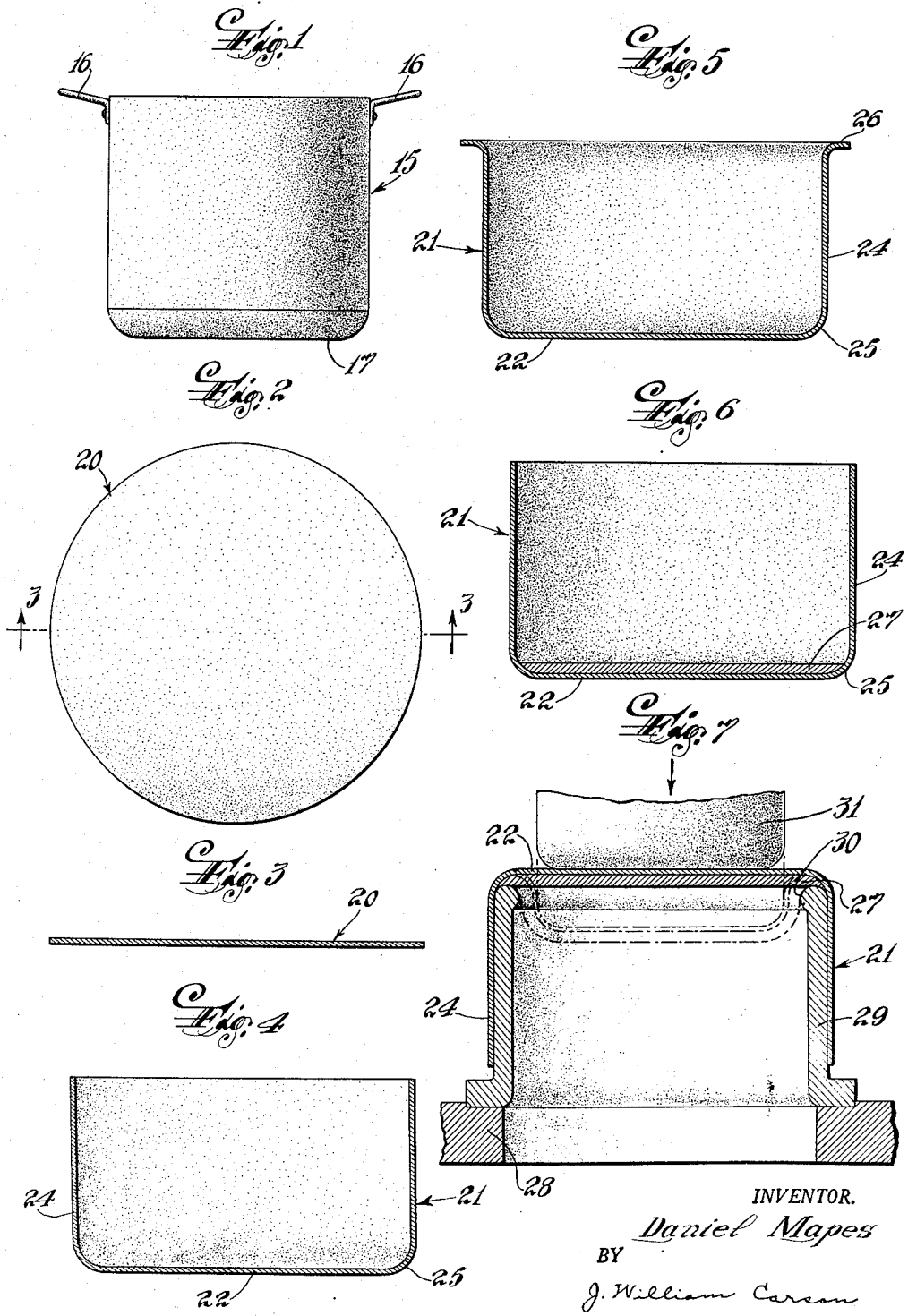
INVENTOR.
Daniel Mapes
BY
J. William Carson
ATTORNEY Aug. 15, 1950          D. MAPES          2,518,483
METHOD OF MAKING RECEPTACLES
Filed Feb. 15, 1947          2 Sheets-Sheet 2
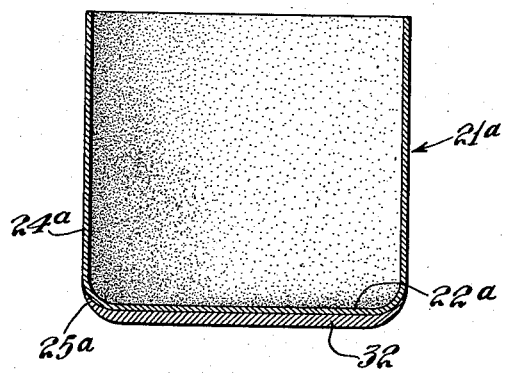
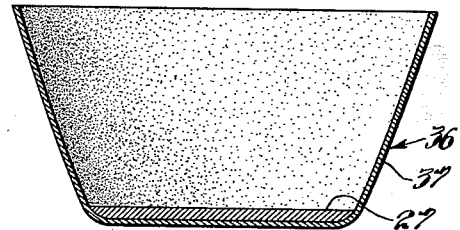
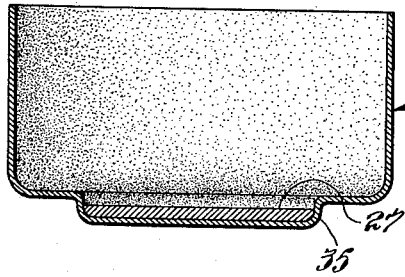
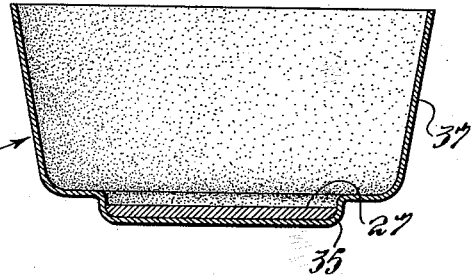
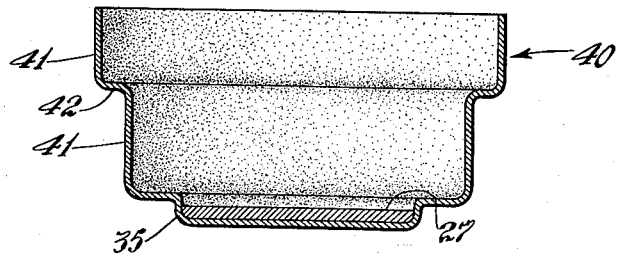
INVENTOR.
Daniel Mapes
BY J. William Carson
ATTORNEY Patented Aug. 15, 1950

2,518,483

UNITED STATES PATENT OFFICE 2,518,483

METHOD OF MAKING RECEPTACLES

Daniel Mapes, West Caldwell, N. J., assignor to Specialties Development Corporation, Belleville, N. J., a corporation of New Jersey Application February 15, 1947, Serial No. 728,757

5 Claims. (Cl. 29—148.2)

1

The present invention relates to methods of forming metallic receptacles, and more particularly to the provision of receptacles formed of a metal which has one heat conductive characteristic and having a layer of metal at the bottom thereof which has another heat conductive characteristic.

The invention is concerned with, but not limited to, the formation of stainless steel receptacles, which have poor heat conductive characteristics, having a relatively thick layer of copper on the bottom thereof adapted to give the bottom of the receptacle a good heat conductive characteristic. The layer of copper covers the bottom of the receptacle and extends around the upcurved corner portions joining the bottom and side walls of the receptacle. The layer is substantially of uniform thickness at the bottom and is of gradually diminishing thickness at the corner portions.

Heretofore receptacles of the forgoing type have been made by electroplating layers of copper to the bottom of stainless steel receptacles. The methods employed in forming such layers necessitated complicated electroplating apparatus and chemical treatments which required accurate controls or highly skilled labor. Also, the quantity of current required to so electroplate the receptacles was substantially high and made the process relatively expensive.

While in my copending joint application Serial Number 705,932, filed October 26, 1946, there is disclosed a method of forming such receptacles which overcomes the prior difficulties; the present invention aims to provide another method of forming similar receptacles which also overcomes these prior difficulties.

Accordingly, an object of the present invention is to provide a novel, inexpensive method of making receptacles of the foregoing character.

Another object is to provide a simple method of making such receptacles which does not require complicated apparatus or controls and can be performed by unskilled labor.

A further object is to provide a method of making such receptacles wherein the formation of the receptacle is facilitated by the shape of the cup from which the receptacle is formed.

Other and further objects of the invention will be obvious upon an understanding of the illustrative embodiment about to be described, or will be indicated in the appended claims, and various advantages not referred to herein will occur to one skilled in the art upon employment of the invention in practice.

2

In accordance with the invention, the foregoing objects and advantages are accomplished by drawing a sheet of metal or blank in a direction to form a cup having a bottom and a side wall, establishing a pool of molten metal on the bottom at the interior of the cup, solidifying the metal to bond the same to the cup, and re-drawing the cup in an opposite direction to reverse the bottom and side wall whereby the metal is positioned on the bottom at the exterior of the cup.

More particularly, this is accomplished by forming a generally cup-shaped sheet metal blank of low heat conductivity having a generally circular bottom portion and an upwardly extending wall portion connected by an annular upwardly curved rounded interior corner portion adjacent to and surrounding the bottom portion, establishing at the interior of the blank a pool of molten metal having high heat conductivity of a depth of at least about the thickness of the sheet metal blank to cover the bottom portion and to at least partially cover the annular rounded corner portion, solidifying the molten metal to cause the same to be bonded to the blank, reverse drawing the blank to position the bonded metal at the exterior of the blank while reducing the diameter of the bottom portion, and drawing the interior corner portion into an exterior outwardly and upwardly curved annular corner having an outer layer of metal thereon gradually diminishing in thickness in an outwardly and upwardly direction.

In order to facilitate reverse drawing of the cup the side wall may be of increasing diameter from the bottom to the upper edge thereof, for example, by being flared upwardly and outwardly or by having zones of increasing diameter.

In the accompanying drawing:

Figure 1 is a side elevational view illustrating a receptacle in the form of a cooking pot embodying the invention.

Figure 2 is a plan view of a metallic blank adapted to be formed into a receptacle.

Figure 3 is a sectional view of the blank taken along the line 3—3 on Figure 2.

Figure 4 is a sectional view illustrating a cup drawn from the blank.

Figure 5 is a sectional view illustrating the cup formed with a lateral flange at the free edge thereof.

Figure 6 is a sectional view of the cup shown in Figure 4 with a pool of metal established on the bottom at the interior thereof.

Figure 7 is a sectional view illustrating the cup after the pool has solidified and has been bonded to the cup, with the cup supported on a die and about to be reverse drawn therethrough by a punch.

Figure 8 is a sectional view illustrating the cup after being reverse drawn to provide a receptacle body having the layer of metal bonded to the bottom at the exterior thereof.

Figures 9, 10, 11 and 12 are sectional views of modified cups prior to being reverse drawn.

Referring to the drawing in detail and more particularly to Figure 1, there is shown a receptacle in the form of a deep cooking pot 15 having carrying handles 16 secured thereto. The body of the pot is formed of stainless steel and the bottom portion thereof has bonded thereto a layer of copper 17 which is of substantially uniform thickness at the bottom and gradually diminishes in thickness at the rounded corner joining the bottom and the side wall of the pot (Figure 8). The high heat conductivity of the copper layer tends to uniformly distribute the heat transferred through the layer of stainless steel. While a cooking pot is illustrated by way of example, it will be understood that the invention is applicable to other forms of cooking vessels or utensils and to receptacles utilized for other purposes.

The method of forming the receptacle 15 is illustrated more particularly by Figures 2 to 8. This method comprises forming a substantially circular blank 20 (Figures 2 and 3) from a sheet of stainless steel and drawing the blank into a cup 21 (Figure 4) having a flat bottom 22, a vertical side wall 24 and rounded corner portions 25 joining the bottom and the side wall. If desired, as shown in Figure 5, a short lateral flange 26 may be provided at the upper edge of the side wall to facilitate reverse drawing the cup 21.

A charge 27 comprising metallic copper in any suitable form and a suitable brazing flux is placed in the cup 21 and rests on the bottom 22 at the interior (Figure 6). The charge is heated by placing the cup in a furnace which is supplied with a reducing atmosphere and is maintained at a temperature to melt the copper to thereby establish a pool of molten copper on the bottom of the cup. After the copper has melted, the temperature in the furnace is reduced to a desired value while maintaining the reducing atmosphere, at which value, the pool becomes solidified and the stainless steel can be quenched to retain its annealed state to facilitate further drawing thereof.

In order to reverse draw the cup 21, the blank is placed in an inverted position on a die 29 (Figure 7) which has a throat or opening 30 and is supported on an apertured holder 28, and a punch 31 cooperating with the die is caused to engage the bottom 22 of the cup at the exterior thereof. As the punch moves through the die, the side wall 24 is reversed or turned inside out to form a cup 21a, as shown in Figure 8, having a layer of copper 32 bonded on the bottom 22a at the exterior.

Preferably, the die and punch are of such dimensions so as to reduce the diameter of the cup 21 during the reverse drawing operation. The resulting cup 21a has a layer of copper thereon which is of substantially uniform thickness at the bottom 22a and is of diminishing thickness on the rounded corner portions 25a as the layer approaches the side wall 24a.

In Figure 9 a cup 34 is shown which is similar to the cup 21 but has a charge receiving recess or depression 35 in the central portion of its bottom at the interior thereof.

In Figure 10 a modified cup 36 is shown having a side wall 37 which is flared upwardly and outwardly. The charge 27 is placed on the bottom at the interior.

In Figure 11 a cup 39 is shown which embodies the features of the cups 34 (Figure 9) and 36 (Figure 10) by being provided with a charge receiving recess 35 in the bottom and a flared side wall 37.

In Figure 12 a cup 40 is shown which is provided with a charge receiving recess 35 in the bottom and a stepped side wall comprising two or more vertical annular zones 41 connected by a horizontal annular zone 42. It will be appreciated that the zones 41 and 42 could also be flared upwardly and outwardly, if desired.

The cups shown in Figures 9 to 12, inclusive, may be provided with a lateral flange 26 as shown in Figure 5 and are adapted to be reverse drawn into the form of the cup 21a shown in Figure 8 by utilizing a die and punch substantially in accordance with Figure 7.

The side walls of the cups shown in Figures 10, 11 and 12 increase in diameter from the bottom to the upper edge thereof to facilitate reverse drawing thereof.

While the present invention has been described in connection with depositing a layer of copper on stainless steel, it will be appreciated that the methods described herein can be utilized for bonding a layer of other nonferrous metals to a receptacle body formed of other ferrous or nonferrous metals.

From the foregoing description, it will be seen that the present invention provides a novel, practical and economical method of applying a layer of metal to a receptacle body formed of another metal. The charge of metal and flux can be readily melted and solidified to provide a smooth deposit of sound metal, which layer, upon reverse drawing of the cups, remains securely bonded thereto.

By practicing the methods described herein, improved receptacles and the like can be provided in a rapid and inexpensive manner. These receptacles are light in weight, rugged in construction and have very desirable heat exchange characteristics.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. The method of forming receptacles, which comprises forming a generally cup-shaped sheet metal blank of low heat conductivity having a generally circular bottom portion and an upwardly extending wall portion connected by an annular upwardly curved rounded interior corner portion adjacent to and surrounding the bottom portion, establishing at the interior of the blank a pool of molten metal having high heat conductivity of a depth of at least about the thickness of the sheet metal blank to cover the bottom portion and to at least partially cover the annular rounded corner portion, solidifying the molten metal to cause the same to be bonded to the blank, reverse drawing the blank to position the bonded metal at the exterior of the blank while reducing the diameter of the bottom portion, and drawing the interior corner portion into an exterior outwardly and upwardly curved annular corner having an outer layer of metal thereon gradually diminishing in thickness in an outwardly and upwardly direction.

2. The method of forming receptacles, which comprises forming a generally cup-shaped sheet metal blank of low heat conductivity having a generally flat, circular bottom and an upwardly extending cylindrical side wall connected to the bottom by an annular upwardly curved rounded interior corner portion, establishing at the interior of the blank a pool of molten metal having high heat conductivity of a depth of at least about the thickness of the sheet metal blank to cover the bottom and to at least partially cover the annular rounded corner portion, solidifying the molten metal to cause the same to be bonded to the blank, reverse drawing the blank to position the bonded metal at the exterior of the blank while reducing the diameter of the bottom, and drawing the interior corner portion into an exterior curved annular corner connecting the side wall and bottom having an outer layer of metal thereon gradually diminishing in thickness from the bottom to the side wall.

3. The method of forming receptacles, which comprises forming a generally cup-shaped sheet metal blank of low heat conductivity having a generally flat, circular bottom and an upwardly extending outwardly flared side wall connected to the bottom by an annular upwardly curved rounded interior corner portion, establishing at the interior of the blank a pool of molten metal having high heat conductivity of a depth of at least about the thickness of the sheet metal blank to cover the bottom and to at least partially cover the annular rounded corner portion, solidifying the molten metal to cause the same to be bonded to the blank, reverse drawing the blank to position the bonded metal at the exterior of the blank while reducing the diameter of the bottom, and drawing the interior corner portion into an exterior curved annular corner connecting the side wall and bottom having an outer layer of metal thereon gradually diminishing in thickness from the bottom to the side wall.

4. The method of forming receptacles, which comprises forming a generally cup-shaped sheet metal blank of low heat conductivity having a bottom provided with a generally circular depressed central portion, an upwardly extending wall portion connected to the central portion by an annular upwardly curved rounded interior corner portion and a side wall extending upwardly from the outer periphery of the bottom, establishing at the interior of the blank a pool of molten metal having high heat conductivity of a depth of at least about the thickness of the sheet metal blank to cover the depressed portion and to at least partially cover the annular rounded corner portion, solidifying the molten metal to cause the same to be bonded to the blank, reverse drawing the blank to position the bonded metal at the exterior of the blank while reducing the diameter of the bottom and forming the outer portion of the bottom into a portion of the side wall, and drawing the interior corner portion into an exterior curved annular corner connecting the side wall and bottom having an outer layer of metal thereon gradually diminishing in thickness from the bottom to the side wall.

5. The method of forming receptacles, which comprises forming a generally cup-shaped sheet metal blank of low heat conductivity having a bottom provided with a generally circular depressed central portion, an upwardly extending wall portion connected to the central portion by an annular upwardly curved rounded interior corner portion and a side wall extending upwardly from the outer periphery of the bottom formed with substantially cylindrical zones increasing in diameter from the bottom towards the upper edge of the side wall, establishing at the interior of the blank a pool of molten metal having high heat conductivity of a depth of at least about the thickness of the sheet metal blank to cover the depressed portion and to at least partially cover the annular rounded corner portion, solidifying the molten metal to cause the same to be bonded to the blank, reverse drawing the blank to position the bonded metal at the exterior of the blank while reducing the diameter of the bottom and forming the outer portion of the bottom into a portion of the side wall, drawing the interior corner portion into an exterior curved annular corner connecting the side wall and bottom having an outer layer of metal thereon gradually diminishing in thickness from the bottom to the side wall, and forming the cylindrical zones into a substantially straight side wall during the reverse drawing operation.

DANIEL MAPES.

REFERENCES CITED

The following references are of record in the file of this patent:

UNITED STATES PATENTS

| Number | Name | Date |
|---|---|---|
| 440,694 | Burdon | Nov. 18, 1890 |
| 460,550 | Bodge | Oct. 6, 1891 |
| 542,422 | Nelson | July 9, 1895 |
| 1,084,115 | Slick | Jan. 13, 1914 |
| 1,649,841 | May | Nov. 22, 1927 |
| 1,886,396 | Hainlen | Nov. 8, 1932 |
| 2,057,254 | Sommer | Oct. 13, 1936 |
| 2,272,609 | Kennedy et al. | Feb. 10, 1942 |
| 2,359,477 | Hoern | Oct. 3, 1944 |